Jan. 9, 1951　　　　　　　G. S. SHAW　　　　　　2,537,193
UNIFORM DIELECTRIC HEATING IN A WAVE GUIDE
Filed Sept. 20, 1946
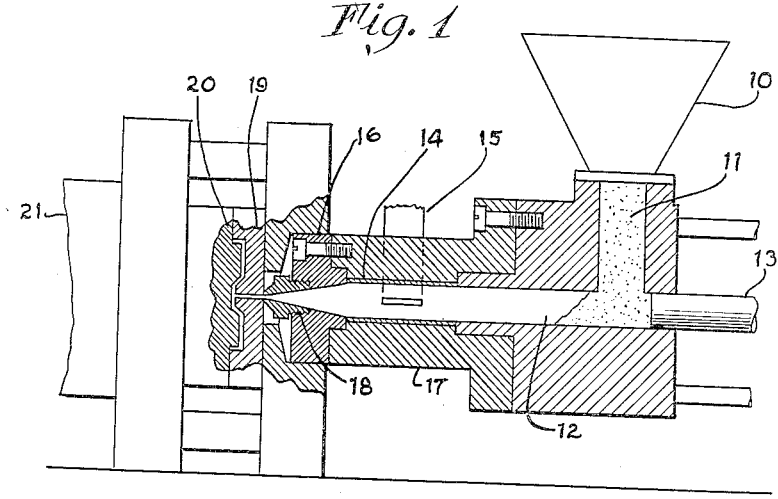
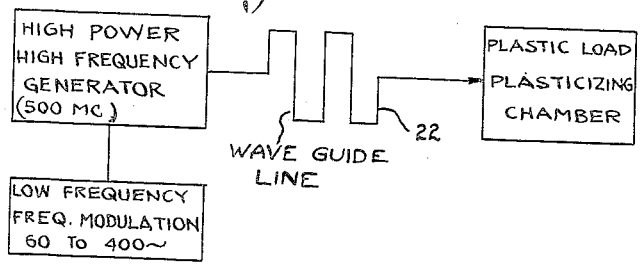
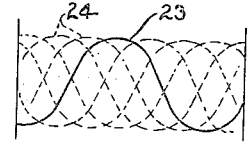
— STANDING WAVE WITHOUT MODULATION
---- MOVEMENT OF STANDING WAVE WITH MODULATION
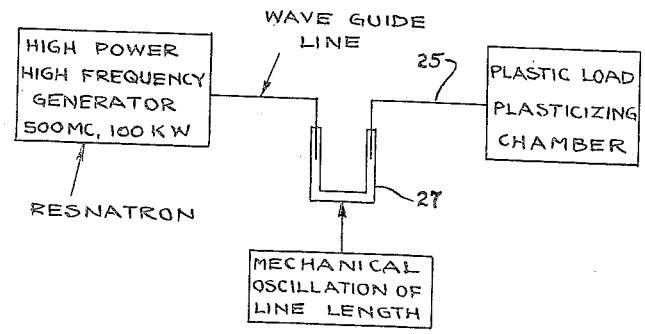
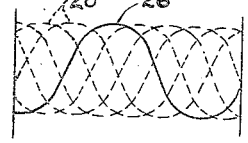
— STANDING WAVE WITHOUT OSCILLATION
--- MOVEMENT OF WAVE WITH OSCILLATION
INVENTOR
GEORGE S. SHAW
BY
Hammond & Littell
ATTORNEYS Patented Jan. 9, 1951

2,537,193

UNITED STATES PATENT OFFICE 2,537,193

UNIFORM DIELECTRIC HEATING IN A WAVE GUIDE

George S. Shaw, Greenwich, Conn., assignor to Hydropress, Incorporated, New York, N. Y., a corporation of Delaware Application September 20, 1946, Serial No. 698,346

8 Claims. (Cl. 18—30)

This invention relates to the dielectric heating of plastics and particularly to a machine and method for heating thermoplastic or thermosetting material in conjunction with injection molding machines.

The heat conducting properties of the usual plastic material is poor so that when heat conduction alone is depended upon, the material will not be evenly heated and there is a danger of burning the layers of the material adjacent the heating chamber walls.

One of the objects of the present invention is to provide a method and apparatus for uniformly heating a plastic throughout a heating chamber therefor by the use of high frequency current. The invention is particularly adaptable for use with relatively large masses of material such as about a one hundred pound batch.

In order to be economical, it is necessary that provisions be made to uniformly heat large quantities of material and when this is done large amounts of power are required such as in the vicinity of fifty kilowatts. The voltage applied is limited by the break down voltage of the plastic to be used, so therefore, when maximum permissible voltage is reached, it is necessary to employ a higher frequency in order to obtain the required power absorption to develop the required heat. When the frequency is in the range of about 150 megacycles per second and above, the heating chamber must be in the form of a wave guide, in place of the conventional electrode plates, this being discussed in detail in the copending application Serial No. 698,242, filed September 20, 1946. When a wave guide is used, as is well known in the art, standing waves will exist therein which normally have stationary maximum points. This will result in a concentration of heat at certain points in the mass of the plastic located in a wave guide as it is being heated. By the present invention, such concentration of heat is avoided and the entire mass of the plastic uniformly heated. These and other objects, features, and advantages of the invention will become apparent from the following description and drawings which are merely exemplary.

In the drawings:

Fig. 1 is a fragmentary sectional view of one type of apparatus wherein the invention may be employed.

Fig. 2 is a block diagram showing one modification for carrying out the invention.

Fig. 3 is a graph indicating the standing wave and change thereof by use of the apparatus shown in Fig. 2.

Fig. 4 is a block diagram showing another modification of a manner in which the invention may be carried out.

Fig. 5 is a graph of the standing wave and the manner in which it is changed by the apparatus of Fig. 4.

In Fig. 1, a suitable thermoplastic may be fed through hopper 10 to passage 11. Passage 11 may have a gate valve (not shown) or conventional feeding means controlling the flow of plastic to the cylinder bore 12, injection plunger 13 being reciprocable in bore 12. The heating chamber or wave guide 14 preferably is of the same diameter as bore 12, the wave guide preferably comprising a cylindrical metal shape, the dimensions of which depend upon the frequency and characteristics of the plastic. The transmission line wave guide 15 is used to connect the wave guide heating chamber 14 with the source of high frequency, not shown in Fig. 1.

As previously mentioned, it has been found that when frequencies of over 150 megacycles per second are used that a wave guide should be employed. Injection nozzle holder 16 may be fastened to the wave guide heating chamber holder 17, injection nozzle holder 16 having a suitable injection nozzle 18 screw-threadedly engaged therein. Dies 19 and 20 are indicated in a closed position where they are held by a conventional ram 21.

Various cycles of feeding of the plastic to the wave guide heating chamber 14 may be employed. For example, the piston 13 may be reciprocated to the left from the position shown in Fig. 1 carrying a charge into the heating chamber at which time the source of high frequency can be operated to energize the wave guide heating chamber.

As previously discussed, a standing wave will be developed in the wave guide heating chamber substantially stationary in position so that heat may be concentrated at one or several points therein, which may overheat the plastic at these points.

In order to correct such a condition, a relatively long wave guide transmission line 22, such as one 200 to 400 feet in length, may be used to connect the high power high frequency generator to the plastic load plasticizing chamber or wave guide heating chamber 17.

The high power high frequency generator may for example be a Resnatron such as described in Proceedings I. R. E., April 1946, page 169W. It is to be understood that various types of high frequency generators may be employed.

As indicated in Fig. 2, in order to cause movement of the standing wave, a conventional low frequency modulation source of between 60 and 400 cycles per second or other suitable frequency can be connected to the high frequency generator for the purpose of causing the standing wave to continuously traverse the heating chamber.

Fig. 3 shows a graph of the wave characteristic in relation to the length of the heating chamber, the standing wave present without the low frequency modulation source being seen at 23. The dotted lines 24 indicate the manner in which the standing wave will be shifted continuously in the plasticizing chamber or wave guide heating chamber.

Another manner in which the standing wave may be shifted is seen in Fig. 4 wherein the high power high frequency generator is connected to the wave guide heating chamber or plastic load by means of a wave guide line 25. Said line 25 has a section 27 which is arranged to be oscillated in any suitable way in a transverse direction relative to the line so as to continuously or periodically change the length of the wave guide line 25. In this manner, standing wave 26 (Fig. 5) will be caused to shift continuously in the wave guide heating chamber as indicated by dotted lines 29.

The type of injection molding machine specifically shown is for illustration only and it is to be understood that the invention can be used with various types of molding machines or for dielectric heating of large masses of plastic in a short space of time. It is also apparent that the change of the wave position may take place in various time cycles or arrangements.

It is evident that changes may be made in the details of construction without departing from the spirit of the invention as defined in the appended claims.

I claim:

1. In a plastic molding apparatus, a wave guide heating chamber, a source of high frequency energy connected to said guide, a feed passage connected to said wave guide, means feeding plastic thereto, feed means moving plastic into said wave guide heating chamber, and wave position shifting means connected with said source of high frequency continuously varying during the heating operation the position of waves in said guide whereby plastic in said guide will be uniformly heated.

2. In a plastic molding machine, a wave guide heating chamber in said machine, adapted to have a plastic capable of being dielectrically heated placed therein, a feed passage connected to said wave guide, means feeding plastic thereto, feed means moving plastic into said wave guide heating chamber, a source of high frequency energy, a long transmission line connecting said wave guide and high frequency source, and means to continuously cyclically vary the length of said transmission line during energization of the wave guide so as to shift wave positions in said guide to uniformly heat plastic therein.

3. In a molding machine, a wave guide heating chamber, a feed passage connected to said wave guide, means feeding plastic thereto, feed means moving plastic into said wave guide heating chamber, a source of high frequency energy connected to said wave guide, and a modulating frequency source connected to said high frequency to vary continuously cyclically the position of the waves in said guide during heating so as to uniformly heat plastic therein.

4. In an injection molding apparatus, a wave guide heating chamber, a feed passage connected thereto, means feeding plastic to said feed passage, an injection plunger connected with said passage, and a source of high frequency energy connected to said guide, wave position shifting means connected with said high frequency source continuously cyclically shifting the position of waves in said guide.

5. In a dielectrically heated plastic injection molding machine for heating plastics capable of being dielectrically heated, a wave guide in said machine, adapted to have plastic to be heated placed therein, a feed passage connected thereto, means feeding plastic to said feed passage, an injection plunger connected with said passage, a source of high frequency energy over about 150 megacycles per second connected to said guide, wave position shifting means connected with said guide changing continuously cyclically the position of waves therein during heating, so as to heat all of said plastic in said wave guide, and injection plunger means feeding plastic to said wave guide and to an injection die chamber.

6. In a molding machine, a wave guide heating chamber, means feeding a plastic capable of being dielectrically heated to said chamber, including a feed passage connected thereto, means feeding plastic to said feed passage, an injection plunger connected with said passage, a source of high frequency energy over about 150 megacycles per second, a long transmission line connecting said wave guide and high frequency source, means to vary the length of said transmission line continuously cyclically during energization of the wave guide so as to shift wave positions in said guide to uniformly heat plastics capable of being dielectrically heated therein.

7. In a molding machine, a wave guide heating chamber, a feed passage connected thereto, means feeding plastic to said feed passage, an injection plunger connected with said passage, a source of high frequency energy over about 150 megacycles per second connected to said wave guide, and a modulating frequency source connected to said high frequency to vary the position continuously cyclically of the waves in said guide during heating so as to uniformly heat plastics capable of being dielectrically heated therein.

8. In an injection molding apparatus, the combination comprising a wave guide heating chamber, means feeding plastic capable of being dielectrically heated, a piston reciprocable relative to said chamber for feeding plastic thereto and to move plastic out of said chamber through an injection means after said plastic has become heated in said chamber, a source of high frequency electrical energy connected to said wave guide heating chamber by a wave guide transmission line, and means connected with said high frequency source continuously cyclically shifting the position of the standing waves in said wave guide so as to uniformly heat all of the plastic to be heated therein.

GEORGE S. SHAW.

(References on following page)

REFERENCES CITED

The following references are of record in the file of this patent:

UNITED STATES PATENTS

| Number | Name | Date |
|---|---|---|
| 1,972,050 | Davis | Aug. 28, 1934 |
| 2,250,096 | Engbert | July 22, 1941 |
| 2,308,043 | Bierwirth | Jan. 12, 1943 |
| 2,364,526 | Hansell | Dec. 5, 1944 |
| 2,370,161 | Hensen | Feb. 27, 1945 |
| 2,381,496 | Hansell | Aug. 7, 1945 |
| 2,398,606 | Wang | Apr. 16, 1946 |
| 2,427,094 | Evans | Sept. 9, 1947 |
| 2,436,640 | Fredholm et al. | Feb. 24, 1948 |
| 2,449,451 | Cassen | Sept. 14, 1948 |
| 2,457,695 | Liskow | Dec. 28, 1948 |

OTHER REFERENCES

"Electronic Torch," Welding Engineer, December 1945, page 90.